(12) United States Patent
Tiwari

(10) Patent No.: US 8,593,956 B2
(45) Date of Patent: Nov. 26, 2013

(54) METHODS FOR CONGESTION CONTROL FOR MACHINE TYPE COMMUNICATION (MTC) DEVICES OR LOW PRIORITY DEVICES, AND APPARATUSES USING THE SAME

(75) Inventor: Kundan Tiwari, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 74 days.

(21) Appl. No.: 13/314,636

(22) Filed: Dec. 8, 2011

(65) Prior Publication Data
US 2012/0155257 A1 Jun. 21, 2012

Related U.S. Application Data

(60) Provisional application No. 61/425,661, filed on Dec. 21, 2010.

(51) Int. Cl.
*G01R 31/08* (2006.01)
(52) U.S. Cl.
USPC ........ 370/230; 370/230.1; 370/235; 370/328; 370/352; 370/465; 455/404.1; 455/410; 455/411; 455/452.1
(58) Field of Classification Search
USPC ...................... 370/230, 230.1, 235, 328, 330, 370/333–337, 352, 392, 434, 465; 455/404.1, 410, 411, 452.1
See application file for complete search history.

(56) References Cited

U.S. PATENT DOCUMENTS

| 7,720,489 | B2 * | 5/2010 | Engelhart, Sr. ............ 455/456.5 |
| 8,081,974 | B2 * | 12/2011 | Fischer et al. ................ 455/434 |
| 8,284,750 | B2 * | 10/2012 | Cayla et al. ................... 370/346 |
| 2002/0131397 | A1 * | 9/2002 | Patel et al. .................... 370/349 |
| 2005/0271008 | A1 * | 12/2005 | Gallagher et al. ........... 370/329 |
| 2005/0272422 | A1 | 12/2005 | Asadi |
| 2008/0182609 | A1 * | 7/2008 | Somasundaram et al. ..... 455/522 |
| 2008/0267126 | A1 * | 10/2008 | Vujcic et al. ................. 370/330 |
| 2008/0279257 | A1 * | 11/2008 | Vujcic et al. ................. 375/132 |
| 2009/0196230 | A1 * | 8/2009 | Kim et al. ..................... 370/328 |
| 2009/0240831 | A1 * | 9/2009 | Liu et al. ...................... 709/233 |

(Continued)

OTHER PUBLICATIONS

3GPP, "Technical Specification Group Services and System Aspects; General Packet Radio Service (GPRS); Service description; Stage 2 (Release 10)", 3GPP TS 23.060, V10.2.0, Dec. 2010, pp. 1-316.

(Continued)

*Primary Examiner* — Andrew Lai
*Assistant Examiner* — Andrew C Lee
(74) *Attorney, Agent, or Firm* — Birch, Stewart, Kolasch & Birch, LLP

(57) ABSTRACT

A mobile communication device configured for Machine Type Communication (MTC) or configured as a low priority device is provided. In the mobile communication device, a wireless module performs wireless transmissions and receptions to and from a service network, and a controller module transmits a connection request message to the service network via the wireless module in response to initiating a combined attachment procedure or a combined routing area update procedure for both Packet-Switched (PS) and Circuit-Switched (CS) domains, and receives a connection rejection message with an indication of an extended wait timer from the service network via the wireless module. Also, the controller module initiates a location registration procedure for the CS domain or enters a substate in which initiation of the location registration procedure for the CS domain is allowed, in response to the connection rejection message for the PS domain.

16 Claims, 7 Drawing Sheets

(56) References Cited

U.S. PATENT DOCUMENTS

| | | | |
|---|---|---|---|
| 2009/0265543 A1* | 10/2009 | Khetawat et al. | 713/151 |
| 2010/0002582 A1* | 1/2010 | Luft et al. | 370/230.1 |
| 2010/0105405 A1* | 4/2010 | Vujcic | 455/452.1 |
| 2010/0172299 A1* | 7/2010 | Fischer et al. | 370/328 |
| 2010/0210243 A1* | 8/2010 | Vujcic | 455/411 |
| 2010/0226248 A1* | 9/2010 | Grilli | 370/230 |
| 2011/0122789 A1* | 5/2011 | Haustein et al. | 370/252 |
| 2012/0008573 A1* | 1/2012 | Shiva et al. | 370/329 |

OTHER PUBLICATIONS

3GPP, "Technical Specification Group Services and System Aspects; System Improvements for Machine-Type Communications; (Release 10)", 3GPP TR 23.888, V1.0.0, Jul. 2010, pp. 1-80.

Catt, "Rejecting attach service request for low value MTC device", 3GPP TSG SA WG2 Meeting #80, S2-103446, Aug. 3-30, 2010, 11 pages provided.

SA2, "(DRAFT) LS on Clarifications for MM Back-off Timer", 3GPP TSG-SA2 Meeting #84, Tdoc S2-112132, Apr. 11-15, 2011, 2 pages provided.

TSG CN WG1, "CRs to Rel-6 WI 'ACBOP' for TS 23.122 and TS 24.008", 3GPP TSG CN Meeting #27, Mar. 9-11, 2005, NP-050083, 32 pages provided, XP002435293.

3GPP TSG RAN WG2 Meeting #71bis, R2-105387, Xi'an, China (Oct. 3, 2010); 11 pages.

3GPP TSG-GERAN Meeting #36 Change Request GP-071977, Vancouver, Canada (Nov. 16, 2007); 14 pages.

* cited by examiner

METHODS FOR CONGESTION CONTROL FOR MACHINE TYPE COMMUNICATION (MTC) DEVICES OR LOW PRIORITY DEVICES, AND APPARATUSES USING THE SAME

CROSS REFERENCE TO RELATED APPLICATIONS

This application claims priority of U.S. Provisional Application No. 61/425,661, filed on Dec. 21, 2010, and the entirety of which is incorporated by reference herein.

BACKGROUND OF THE INVENTION

1. Field of the Invention

The invention generally relates to congestion control techniques, and more particularly, to methods for congestion control for Machine Type Communication (MTC) devices or low priority devices, and apparatuses using the same.

2. Description of the Related Art

For a long time, various machines have been provided to make our lives more convenient in every way. Generally, machines, nowadays, are equipped with computing processors and software to accommodate us with more intelligence-based services. With the advancement of wireless communications, Machine Type Communication (MTC) has been developed to enable communications between remote machines for exchanging information and operating without human interaction. Especially for critical public infrastructures, such as water treatment facilities or bridges, MTC sensors may be employed to monitor the operation statuses of facilities and report measurement results back to control centers via wireless communication networks, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and others.

Take the LTE technology in compliance with the 3GPP TS 23.060 specification, v10.1.0 (referred to herein as the TS 23.060 specification) and the 3GPP TS 25.331 specification, v10.1.0 (referred to herein as the TS 25.331 specification) as an example. When too many mobile devices access the Serving GPRS Support Node (SGSN), congestion may occur in the SGSN, i.e., the Packet-Switched (PS) domain of the service network is congested. For the PS domain congestion, the SGSN may instruct Radio Network Controller/Base Station Subsystem (RNC/BSS) to reject the connection request for the PS domain from any of the MTC devices or low priority devices, wherein an extended wait timer is indicated along with the rejection of the connection request. When the connection request is rejected, the MTC device or low priority device starts the extended wait timer and does not initiate establishment of a PS connection during the running period of the extended wait timer. However, there are situations where an MTC device or low priority device may transmit a connection request for both the PS domain and the Circuit-Switched (CS) domain for initiation of a combined attached procedure or combined routing area update procedure when the PS domain congestion occurs. Although the CS domain of the service network may not be congested, the behavior of the service network for the CS domain is indeterminate for such cases. As a result, problems such as indeterminate behaviors of the service network and the MTC device or low priority device may occur.

BRIEF SUMMARY OF THE INVENTION

In one aspect of the invention, a mobile communication device configured for MTC or configured as a low priority device is provided. The mobile communication device comprises a wireless module and a controller module. The wireless module performs wireless transmissions and receptions to and from a service network. The controller module transmits a connection request message to the service network via the wireless module in response to initiating a combined attachment procedure or a combined routing area update procedure for both PS and CS domains, and receives a connection rejection message with an indication of an extended wait timer from the service network via the wireless module. Also, the controller module initiates a location registration procedure for the CS domain or enters a substate in which initiation of the location registration procedure for the CS domain is allowed, in response to the connection rejection message for the PS domain.

Correspondingly, a method for congestion control by a mobile communication device configured for MTC or configured as a low priority device is provided. The method comprises the steps of transmitting a connection request message to the service network in response to initiating a combined attachment procedure or a combined routing area update procedure for both PS and CS domains, receiving a connection rejection message with an indication of an extended wait timer from the service network, and initiating a location registration procedure for the CS domain or entering a substate in which initiation of the location registration procedure for the CS domain is allowed, in response to the connection rejection message for the PS domain.

In another aspect of the invention, a mobile communication device, configured for MTC or configured as a low priority device is provided. The mobile communication device comprises a wireless module and a controller module. The wireless module performs wireless transmissions and receptions to and from a service network. The controller module receives a connection release message for a PS domain with an indication of an extended wait timer from the service network via the wireless module, and starts a back-off timer corresponding to the extended wait timer in response to the connection release message for the PS domain. Also, the controller module does not initiate any connection establishment for the PS domain during the running period of the back-off timer.

Correspondingly, a method for congestion control by a mobile communication device configured for MTC or configured as a low priority device is provided. The method comprises the steps of receiving a connection release message for a PS domain with an indication of an extended wait timer from the service network, starting a back-off timer corresponding to the extended wait timer in response to the connection release message for the PS domain, and not initiating any connection establishment for the PS domain during the running period of the back-off timer.

In yet another aspect of the invention, a service network is provided. The service network comprises a core network and an access network. The core network restricts any access for a PS domain from a mobile communication device configured for MTC or configured as a low priority device, when detecting a system overload for the PS domain. The access network transmits a connection release message for the PS domain with an indication of an extended wait timer to the mobile communication device in response to the access restriction, to forbid any access attempt of the mobile communication device for the PS domain during a time period specified for the extended wait timer.

Correspondingly, a method for congestion control for MTC devices or low priority devices by a service network is provided. The method comprises the steps of detecting a system overload for a PS domain, and restricting any access for the PS domain from a mobile communication device configured for MTC or configured as a low priority device in response to the system overload for the PS domain, by transmitting a connection release message for the PS domain with an indication of an extended wait timer to the mobile communication device, so as to forbid any access attempt of the mobile communication device for the PS domain during a time period specified for the extended wait timer.

Other aspects and features of the present invention will become apparent to those with ordinarily skill in the art upon review of the following descriptions of specific embodiments of apparatuses and methods for congestion control for MTC devices or low priority devices.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

Figure 1:
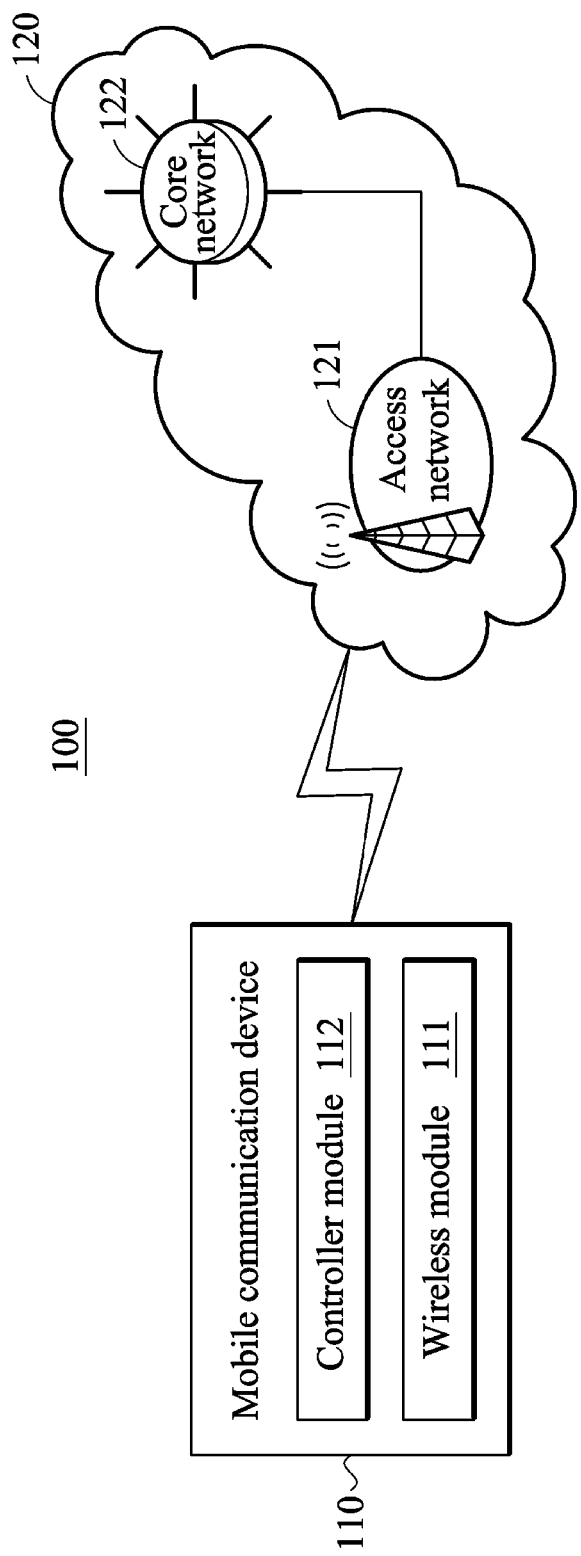
FIG. 1 is a block diagram illustrating a mobile communication environment according to an embodiment of the invention.

In order to solve the aforementioned problems, the invention provides apparatuses and methods for congestion control for MTC devices or low priority devices. FIG. 1 is a block diagram illustrating a mobile communication environment according to an embodiment of the invention. In the mobile communication environment 100, the mobile communication device 110 is configured for MTC or configured as a low priority device, and is wirelessly connected to the service network 120 for obtaining wireless services. The service network 120 may comprise an access network 121 and a core network 122, wherein the access network 121 may be a Universal Terrestrial Radio Access Network (UTRAN) in the WCDMA technology or an E-UTRAN (Evolved-UTRAN) in the LTE/LTE-Advanced technology, and the core network 122 may be a GPRS core in the WCDMA technology or an Evolved Packet Core (EPC) in the LTE/LTE-Advanced technology. The mobile communication device 110 comprises a wireless module 111 for performing the functionality of wireless transmissions and receptions to and from the service network 120, and a controller module 112 for controlling the operation of the wireless module 111 and other functional components, such as a display unit and/or keypad serving as the MMI (man-machine interface), a storage unit storing the program codes of applications or communication protocols, or others. To further clarify, the wireless module 111 may be a radio frequency (RF) unit, and the controller module 112 may be a general-purpose processor or a micro-control unit (MCU) of a baseband unit. The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in WCDMA systems, or may be 900 MHz, 2100 MHz, or 2.6 GHz utilized in LTE/LTE-Advanced systems, or others depending on the Radio Access Technology (RAT) in use.

Figure 2:
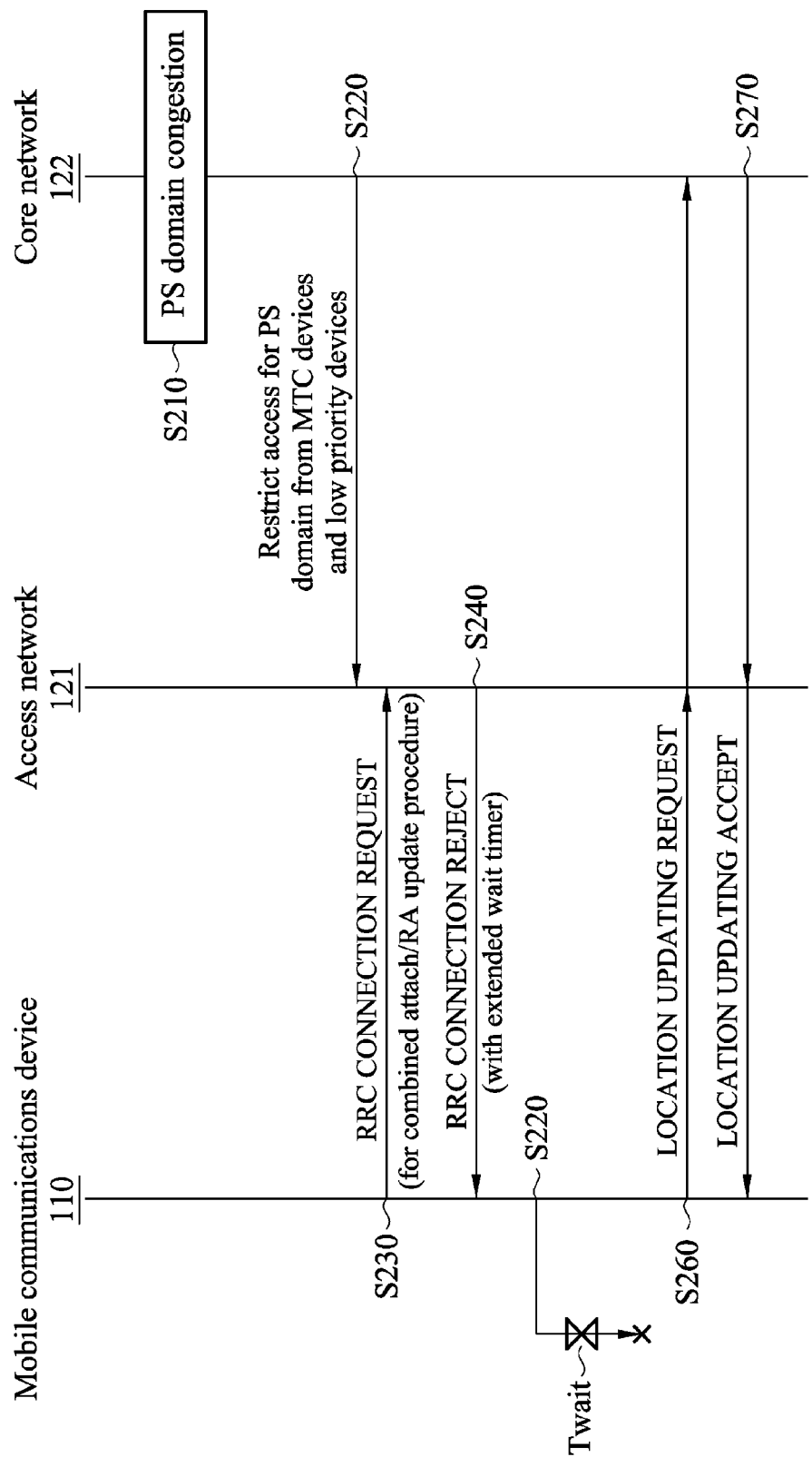
FIG. 2 is a message sequence chart illustrating the congestion control with a connection release message for an MTC device or a low priority device according to an embodiment of the invention.

To be more specific, the controller module 112 controls the wireless module 111 for PS domain congestion control. FIG. 2 is a message sequence chart illustrating the congestion control with a connection release message for an MTC device or a low priority device according to an embodiment of the invention. As shown in FIG. 2, the core network 122 first detects the occurrence of congestion for the PS domain of the service network 120 (step S210), and then instructs the access network 121 to restrict the access for the PS domain from any of the MTC devices and low priority devices (step S220). After the occurrence of the PS domain congestion, the mobile communication device 110 which is configured for MTC or configured as a low priority device transmits an RRC CONNECTION REQUEST message to the service network 120 via the wireless module 111, in response to initiating a combined attachment procedure or a combined routing area (RA) update procedure for both the PS and CS domains (step S230). That is, the connection must be established prior to performing the combined attachment procedure or a combined routing area update procedure, if there is no connection between the mobile communication device 110 and the service network 120. When receiving the RRC CONNECTION REQUEST message, the access network 121 replies to the mobile communication device 110 with an RRC CONNECTION REJECT message which indicates an extended wait timer (step S240), since the access network 121 has been instructed to restrict the access for PS domain from any of the MTC devices and low priority devices. When the mobile communication device 110 receives the RRC CONNECTION REJECT message, the controller module 112 starts the extended wait timer (step S250). Note that, during the running period of the extended wait timer, the mobile communication device 110 does not initiate establishment of any connection for the PS domain, i.e., the mobile communication device 110 is forbidden to transmit any connection request message for the PS domain. Unlike the conventional mobile communication devices in compliance with the TS 23.060 and 25.331 specifications, the mobile communication device 110 may proceed to initiate a location registration procedure for obtaining CS services. Specifically, the controller module 112 transmits a LOCATION UPDATING REQUEST message to the service network 120 via the wireless module 111 (step S260). Considering that the congestion of the PS domain does not necessarily infer the congestion of the CS domain, the service network 120 may determine whether to accept the location registration request according to the system loading of the CS domain. In this embodiment, the service network 120 replies to the mobile communication device 110 with a LOCATION UPDATING ACCEPT message due to the fact that the CS domain is not congested (step S270). Thus, the mobile communication device 110 may obtain CS services as fast as possible, instead of waiting till the expiry of the extended wait timer.

Figure 3:
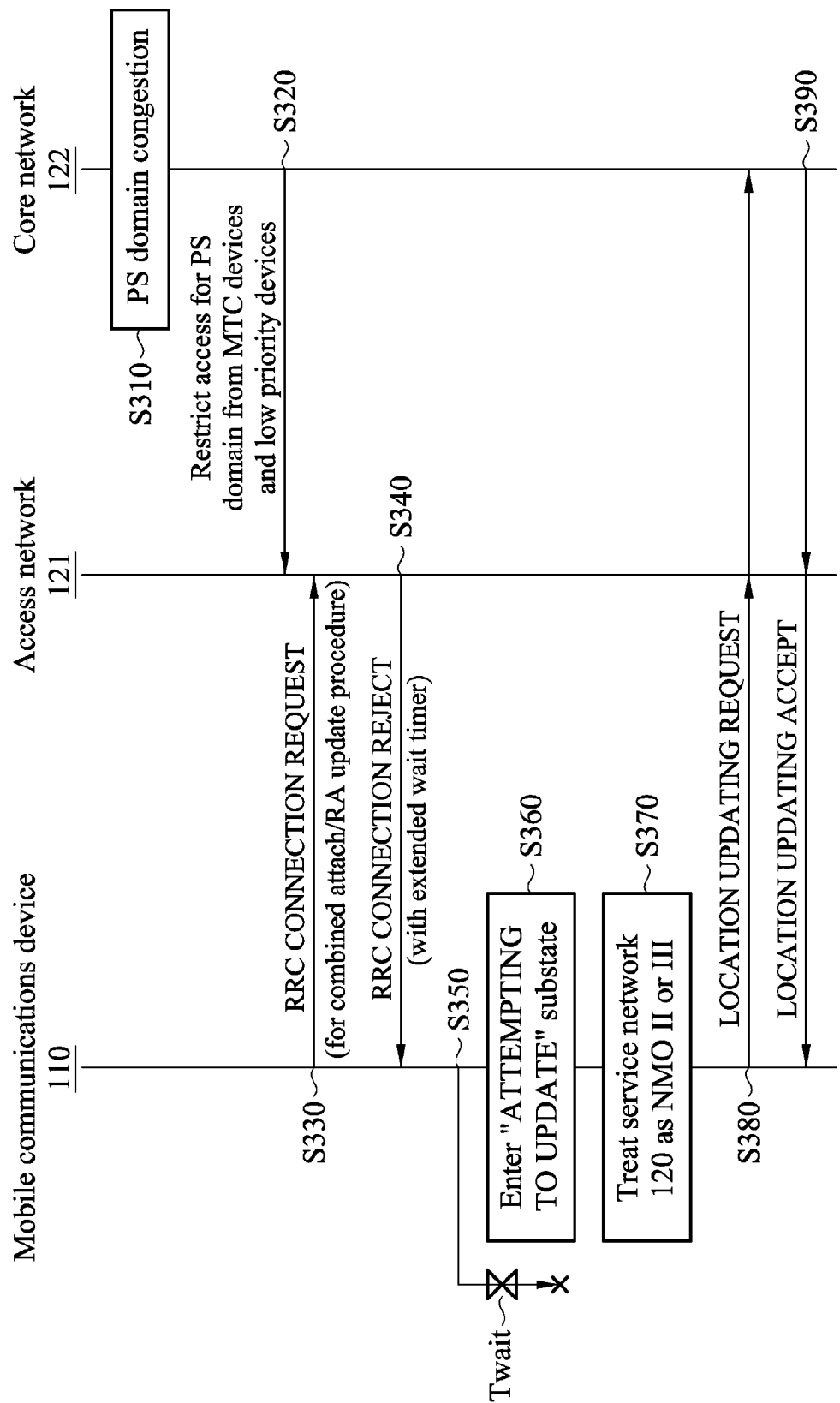
FIG. 3 is a message sequence chart illustrating the congestion control with a connection rejection message for an MTC device or a low priority device according to another embodiment of the invention.

FIG. 3 is a message sequence chart illustrating the congestion control with a connection rejection message for an MTC device or a low priority device according to another embodiment of the invention. Similar to FIG. 2, the core network 122 first detects the occurrence of congestion for the PS domain of the service network 120 (step S310), and then instructs the access network 121 to restrict the access for the PS domain from any of the MTC devices and low priority devices (step S320). After the occurrence of the PS domain congestion, the mobile communication device 110 which is configured for MTC or configured as a low priority device transmits an RRC CONNECTION REQUEST message to the service network 120 via the wireless module 111, in response to initiating a combined attachment procedure or a combined routing area update procedure for both the PS and CS domains (step S330). That is, the connection must be established prior to performing the combined attachment procedure or a combined routing area update procedure, if there is no connection between the mobile communication device 110 and the service network 120. When receiving the RRC CONNECTION REQUEST message, the access network 121 replies to the mobile communication device 110 with an RRC CONNECTION REJECT message which indicates an extended wait timer (step S340), since the access network 121 has been instructed to restrict the access for PS domain from any of the MTC devices and low priority devices. When the mobile communication device 110 receives the RRC CONNECTION REJECT message, the controller module 112 starts the extended wait timer (step S350). Note that, during the running period of the extended wait timer, the mobile communication device 110 does not initiate establishment of any connection for the PS domain, i.e., the mobile communication device 110 is forbidden to transmit any connection request message for the PS domain. Subsequently, the controller module 112 enters the "ATTEMPTING TO UPDATE" substate of the "MM IDLE" state, in which initiation of the location registration procedure for the CS domain is allowed (step S360), and treats the operation mode of the service network 120 as the Network Mode of Operation (NMO) II or III (step S370). When staying in the "ATTEMPTING TO UPDATE" substate, the controller module 112 may initiate a location registration procedure for obtaining CS services by transmitting a LOCATION UPDATING REQUEST message to the service network 120 via the wireless module 111 (step S380). Specifically, the location registration procedure may be initiated in response to a CM connection request from the CM (Connection Management) layer of the mobile communication protocol, which is generated by a user's request or the change of the location of the mobile communication device 110, or in response to the expiry of a periodic timer for the location registration procedure. In one embodiment, the communication protocol may be implemented as program code which is executed in the controller module 112. As the CS domain is not congested in this embodiment, the service network 120 replies to the mobile communication device 110 with a LOCATION UPDATING ACCEPT message (step S390). Thus, the mobile communication device 110 may obtain CS services as fast as possible, instead of waiting till the expiry of the extended wait timer like the conventional mobile communication devices.

Figure 4:
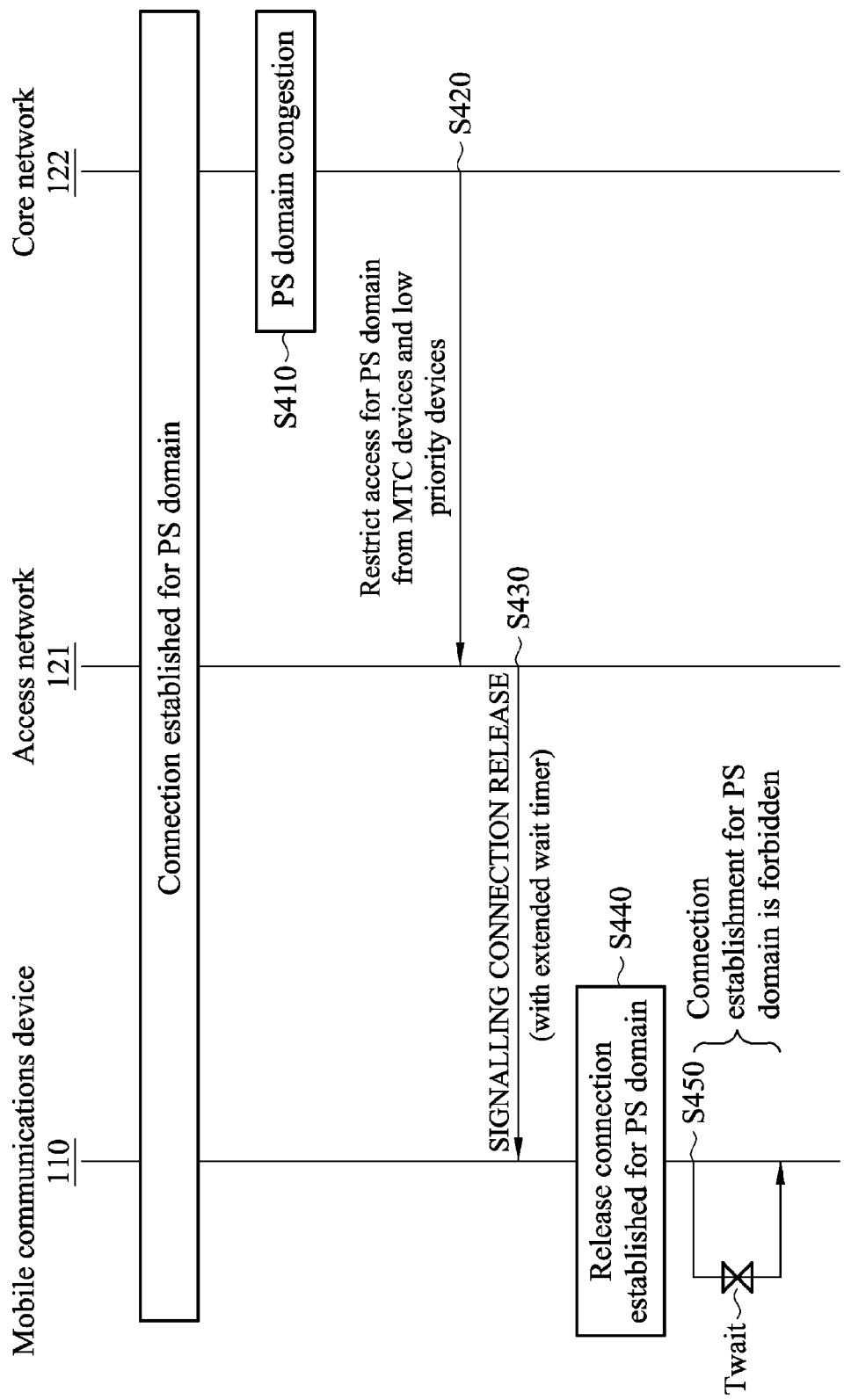
FIG. 4 is a message sequence chart illustrating the congestion control with a connection release message for an MTC device or a low priority device according to an embodiment of the invention.

FIG. 4 is a message sequence chart illustrating the congestion control with a connection release message for an MTC device or a low priority device according to an embodiment of the invention. Initially in this embodiment, at least a connection is established for the PS domain between the mobile communication device 110 and the service network 120. In another embodiment, there may be a first connection established for the PS domain and a second connection established for the CS domain. Later, the core network 122 detects the occurrence of congestion for the PS domain of the service network 120 (step S410), and then instructs the access network 121 to restrict the access for the PS domain from any of the MTC devices and low priority devices (step S420). In response to the instruction of access restriction for the PS domain, the access network 121 transmits a SIGNALLING CONNECTION RELEASE message which indicates a time period for an extended wait timer and indicates the release of the connection for the PS domain (step S430). When the mobile communication device 110 receives the SIGNALLING CONNECTION RELEASE message, the controller module 112 releases the connection established for the PS domain (step S440), and then starts a back-off timer corresponding to the extended wait timer to count the time period indicated in the SIGNALLING CONNECTION RELEASE message (step S450). Specifically, the time period may be passed on to the Non-Access Stratum (NAS) layer in the mobile communication protocol, and the back-off timer is started by the NAS layer. In one embodiment, the mobile communication protocol may be implemented as program code which is executed by the controller module 112. Note that, during the running period of the back-off timer, the mobile communication device 110 does not initiate establishment of any connection for the PS domain, i.e., the mobile communication device 110 is forbidden to initiate any GPRS Mobility Management (GMM) connection until the back-off timer expires.

Figure 5:
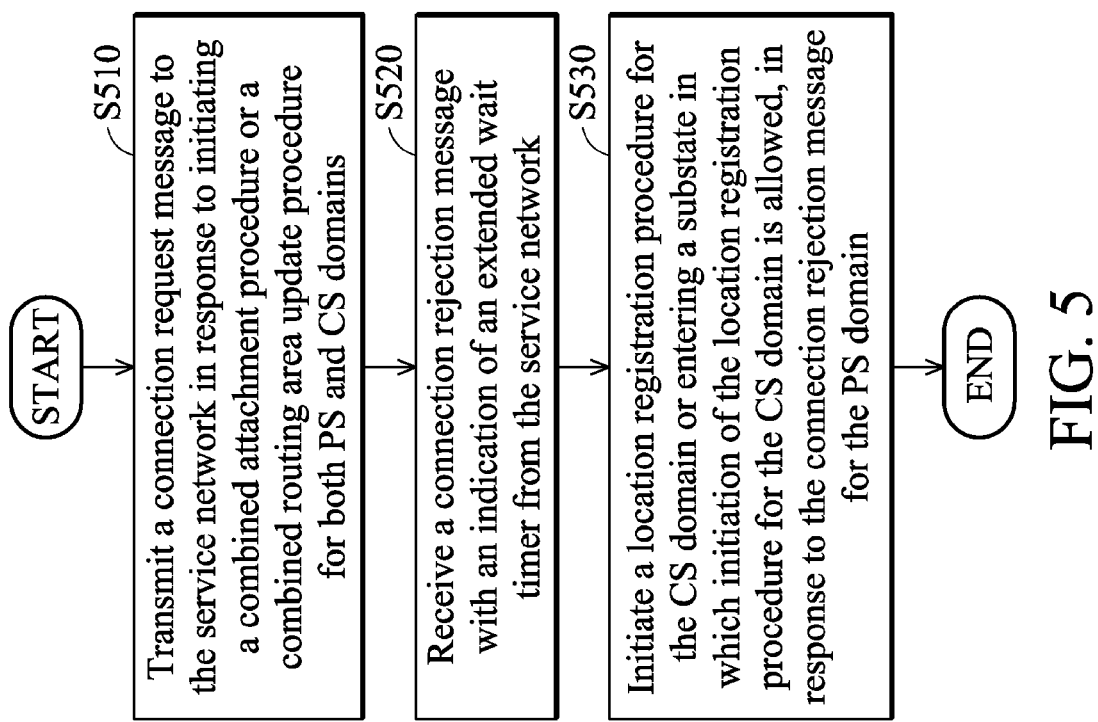
FIG. 5 is a flow chart illustrating a method for congestion control with a connection rejection message for an MTC device or a low priority device according to an embodiment of the invention.

FIG. 5 is a flow chart illustrating a method for congestion control with a connection rejection message for an MTC device or a low priority device according to an embodiment of the invention. In this embodiment, the method may be applied in any mobile communication device which is configured for MTC or configured as a low priority device, such as the mobile communication device 110 in FIG. 1. To begin the method, the mobile communication device transmits a connection request message to a service network in response to initiating a combined attachment procedure or a combined routing area update procedure for both the PS and CS domains (step S510). In other words, to initiate a combined attachment procedure or a combined routing area update procedure, a connection must be established first if there is no connection between the mobile communication device and the service network. Subsequently, the mobile communication device receives a connection rejection message with an indication of an extended wait timer from the service network (step S520). In this embodiment, the connection request is rejected due to the fact that the PS domain of the service network is congested and the access for the PS domain from the MTC devices and low priority devices should be restricted. In response to the connection rejection message, the mobile communication device initiates a location registration procedure for the CS domain or enters a substate in which initiation of the location registration procedure for the CS domain is allowed (step S530). Specifically, the mobile communication device also starts the extended wait timer, and does not initiate any connection establishment for the PS domain during the running period of the extended wait timer. In one embodiment, the mobile communication device may initiate the location registration procedure for the CS domain by transmitting a LOCATION UPDATING REQUEST message to the service network, and may be able to obtain CS services if the service network replies with a LOCATION UPDATING ACCEPT message. In one embodiment, the substate may be the "ATTEMPTING TO UPDATE" substate of the "MM IDLE" state, and the mobile communication device may treat the operation mode of the service network as the NMO II or III in which connection establishments for the CS and PS domains may be performed separately. It is noted that, the method enables the mobile communication device to obtain CS services as fast as possible, instead of waiting till the expiry of the extended wait timer.

Figure 6:
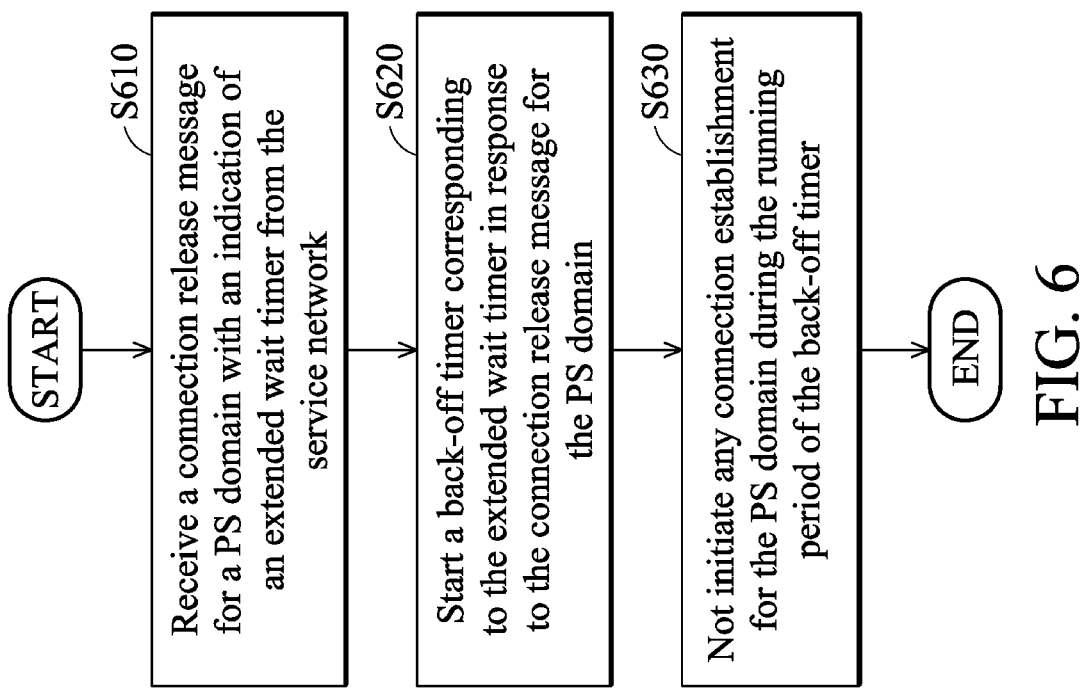
FIG. 6 is a flow chart illustrating a method for congestion control with a connection release message for an MTC device or a low priority device according to an embodiment of the invention.

FIG. 6 is a flow chart illustrating a method for congestion control with a connection release message for an MTC device or a low priority device according to an embodiment of the invention. In this embodiment, the method may be applied in any mobile communication device which is configured for MTC or configured as a low priority device, such as the mobile communication device 110 in FIG. 1. To begin the method, the mobile communication device receives a connection release message for the PS domain with an indication of an extended wait timer from the service network (step S610). In one embodiment, the connection release message may be a SIGNALLING CONNECTION RELEASE message, and may be transmitted by the service network upon detecting PS domain congestion. In response to the connection release message for the PS domain, the mobile communication device starts the extended wait timer (step S620). After that, during the running period of the extended wait timer, the mobile communication device does not initiate any connection establishment for the PS domain (step S630).

Figure 7:
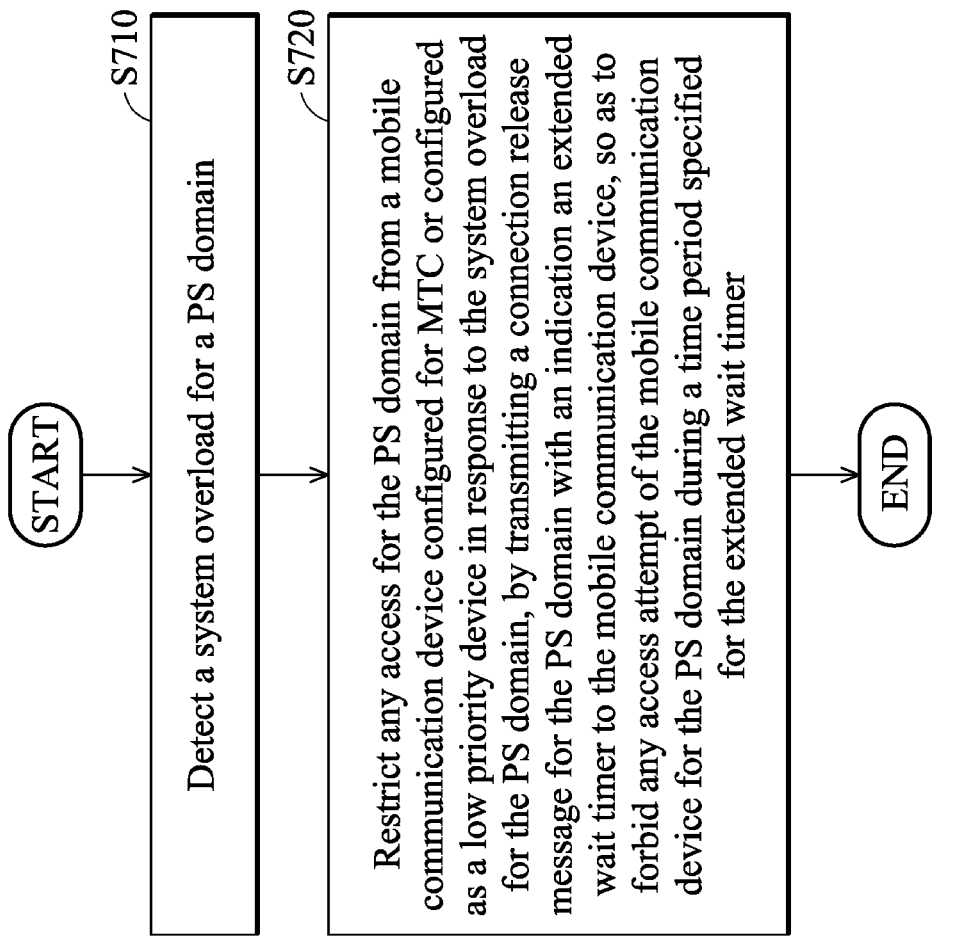
FIG. 7 is a flow chart illustrating a method for congestion control with a connection release message for an MTC device or a low priority device according to another embodiment of the invention.

FIG. 7 is a flow chart illustrating a method for congestion control with a connection release message for an MTC device or a low priority device according to another embodiment of the invention. In this embodiment, the method may be applied in any service network, such as the service network 120 in FIG. 1, for congestion control of access load from an MTC device or a low priority device. To begin the method, the service network first detects a system overload for the PS domain (step S710). In response to the system overload for the PS domain, the service network restricts any access for the PS domain from a mobile communication device configured for MTC or configured as a low priority device, by transmitting a connection release message for the PS domain with an indication of an extended wait timer to the mobile communication device, so as to forbid any access attempt of the mobile communication device for the PS domain during a time period specified for the extended wait timer (step S720). In one embodiment, the connection release message may be a SIGNALLING CONNECTION RELEASE message comprising a timer Information Element (IE) for indicating a time period for the extended wait timer. Specifically, when receiving the connection release message, the mobile communication device releases the established connection for the PS domain and starts a back-off timer corresponding to the extended wait timer to count the time period. Note that, during the running period of the back-off timer, the mobile communication device does not initiate any connection establishment for the PS domain.

Note that, unlike the conventional connection release message in compliance with the TS 23.060 and 25.331 specifications, the connection release message described in FIGS. 6 and 7 comprises a timer IE for indicating a time period for the extended wait timer, so that the mobile communication device may properly start the extended wait timer to hold off the connection establishment for the PS domain.

While the invention has been described by way of example and in terms of preferred embodiment, it is to be understood that the invention is not limited thereto. Those who are skilled in this technology can still make various alterations and modifications without departing from the scope and spirit of this invention. For example, the method for congestion control for MTC devices or low priority devices may also be applied for mobile communication devices and service networks in compliance with any evolutionary technology of the WCDMA/LTE/LTE-Advanced technology. Therefore, the scope of the present invention shall be defined and protected by the following claims and their equivalents.

What is claimed is:

1. A mobile communication device, configured for Machine Type Communication (MTC) or configured as a low priority device, comprising:
   a wireless module performing wireless transmissions and receptions to and from a service network; and
   a controller module transmitting a connection request message to the service network via the wireless module in response to initiating a combined attachment procedure or a combined routing area update procedure for both Packet-Switched (PS) and Circuit-Switched (CS) domains, receiving a connection rejection message with an indication of an extended wait timer from the service network via the wireless module, and initiating a location registration procedure for the CS domain or entering a substate in which initiation of the location registration procedure for the CS domain is allowed, in response to the connection rejection message for the PS domain, wherein the substate is an "ATTEMPTING TO UPDATE" substate of an "MM IDLE" state.

2. The mobile communication device of claim 1, wherein the controller module further starts the extended wait timer in response to the connection rejection message, and does not initiate any connection establishment for the PS domain when the extended wait timer is running.

3. The mobile communication device of claim 2, wherein the controller module further treats an operation mode of the service network as Network Mode of Operation (NMO) II or III during the running period of the extended wait timer, in response to entering the substate.

4. The mobile communication device of claim 1, wherein the controller module further, when in the substate, initiates the location registration procedure for the CS domain in response to a user's request, a change of the location of the mobile communication device, or the expiry of a periodic timer for the location registration procedure.

5. A method for congestion control by a mobile communication device configured for Machine Type Communication (MTC) or configured as a low priority device, comprising:
   transmitting a connection request message to the service network in response to initiating a combined attachment procedure or a combined routing area update procedure for both Packet-Switched (PS) and Circuit-Switched (CS) domains;
   receiving a connection rejection message with an indication of an extended wait timer from the service network; and
   initiating a location registration procedure for the CS domain or entering a substate in which initiation of the location registration procedure for the CS domain is allowed, in response to the connection rejection message for the PS domain, wherein the substate is an "ATTEMPTING TO UPDATE" substate of an "MM IDLE" state.

6. The method of claim 5, further comprising starting the extended wait timer in response to the connection rejection message, and not initiating any connection establishment for the PS domain when the extended wait timer is running.

7. The method of claim 6, further comprising treating an operation mode of the service network as Network Mode of Operation (NMO) II or III during the running period of the extended wait timer, in response to entering the substate.

8. The method of claim 5, further comprising, when in the substate, initiating the location registration procedure for the CS domain in response to a user's request, a change of the location of the mobile communication device, or the expiry of a periodic timer for the location registration procedure.

9. A mobile communication device, configured for Machine Type Communication (MTC) or configured as a low priority device, comprising:
   a wireless module performing wireless transmissions and receptions to and from a service network; and
   a controller module receiving a connection release message for a Packet-Switched (PS) domain with an indication of a time period of an extended wait timer from the service network via the wireless module, starting a back-off timer corresponding to the extended wait timer to count the time period in response to the connection release message for the PS domain, and not initiating any connection establishment for the PS domain during the time period, wherein the connection release message is a SIGNALLING CONNECTION RELEASE message.

10. The mobile communication device of claim 9, wherein the controller module further releases an established connection for the PS domain in response to the connection release message for the PS domain.

11. A method for congestion control by a mobile communication device configured for Machine Type Communication (MTC) or configured as a low priority device, comprising:
   receiving a connection release message for a Packet-Switched (PS) domain with an indication of a time period of an extended wait timer from the service network;
   starting a back-off timer corresponding to the extended wait timer to count the time period in response to the connection release message for the PS domain; and not initiating any connection establishment for the PS domain during the time period, wherein the connection release message is a SIGNALLING CONNECTION RELEASE message.

12. The method of claim 11, further comprising releasing an established connection for the PS domain in response to the connection release message for the PS domain.

13. A service network, comprising:
   a core network restricting any access for a Packet-Switched (PS) domain from a mobile communication device configured for Machine Type Communication (MTC) or configured as a low priority device, when detecting a system overload for the PS domain; and
   an access network transmitting a connection release message for the PS domain with an indication of a time period of an extended wait timer to the mobile communication device in response to the access restriction, to forbid any access attempt of the mobile communication device for the PS domain during the time period specified for the extended wait timer, wherein the connection release message is a SIGNALLING CONNECTION RELEASE message.

14. The service network of claim 13, wherein the mobile communication device releases an established connection for the PS domain and starts a back-off timer corresponding to the extended wait timer to count the time period, in response to receiving the connection release message for the PS domain, and does not initiate any connection establishment for the PS domain when the back-off timer is running.

15. A method for congestion control for Machine Type Communication (MTC) devices or low priority devices by a service network, comprising:
   detecting a system overload for a Packet-Switched (PS) domain; and
   restricting any access for the PS domain from a mobile communication device configured for MTC or configured as a low priority device in response to the system overload for the PS domain, by transmitting a connection release message for the PS domain with an indication of a time period of an extended wait timer to the mobile communication device, so as to forbid any access attempt of the mobile communication device for the PS domain during the time period specified for the extended wait timer, wherein the connection release message is a SIGNALLING CONNECTION RELEASE message.

16. The method of claim 15, wherein the at least one of the mobile communication devices releases an established connection for the PS domain and starts a back-off timer corresponding to the extended wait timer to count the time period, in response to receiving the connection release message for the PS domain, and does not initiate any connection establishment for the PS domain when the back-off timer is running.

* * * * *